United States Patent [19]
Rust et al.

[11] Patent Number: 5,487,138
[45] Date of Patent: Jan. 23, 1996

[54] METHOD TO REDUCE MEMORY REQUIREMENTS IN ASIAN PRINTERS WHILE IMPROVING PERFORMANCE

[75] Inventors: Robert A. Rust; Wayne A. Overby, both of Boise, Id.

[73] Assignee: Hewlett-Packard Company, Palo Alto, Calif.

[21] Appl. No.: 116,181

[22] Filed: Sep. 2, 1993

[51] Int. Cl.$^6$ ..................................................... G06F 15/00
[52] U.S. Cl. ........................... 395/115; 395/116; 395/114
[58] Field of Search ..................................... 395/101, 115, 395/116, 114, 113, 112, 110, 164, 165, 166, 150, 151; 358/404, 444; 400/50, 51, 52, 61, 70, 74, 76; 382/56

[56] References Cited

U.S. PATENT DOCUMENTS

| | | | |
|---|---|---|---|
| 5,129,049 | 7/1992 | Cuzzo et al. | 395/113 |
| 5,218,670 | 6/1993 | Sodek, Jr. et al. | 395/115 |
| 5,272,768 | 12/1993 | Bauman et al. | 395/114 |
| 5,347,266 | 9/1994 | Bauman et al. | 395/110 |

*Primary Examiner*—Mark R. Powell
*Assistant Examiner*—Dov Popovici
*Attorney, Agent, or Firm*—Anthony J. Baca

[57] ABSTRACT

Because laser printers are capable of rendering only a maximum number of characters per unit time, pervious printer would pre-render the entire page prior to print the page. This pre-rendering process greatly increases the memory requirements. To overcome this problem, there is provided a method for reducing memory requirements in a laser printer when printing a page of characters. First, the page is divided into a series of strips. Next, the entire page is scanned strip by strip for any strips that contain an excess number of characters, where the excess number is that number of character that exceeds the maximum number the printer can render in the given time. Assuming a complex strip is found, any common characters in the complex strips are prerendered. If, after pre-rendering the common characters any strip is still complex, then the excess characters are pre-rendered. Finally, each character in a strip is rendered when the printer is ready to print that strip, if any character in the strip was pre-rendered then it is retrieved from memory. Thus, the present invention renders many of the characters while the page is being exposed. Therefore, the printer can start the exposure process sooner and with significantly lower memory requirements.

4 Claims, 3 Drawing Sheets

METHOD TO REDUCE MEMORY REQUIREMENTS IN ASIAN PRINTERS WHILE IMPROVING PERFORMANCE

FIELD OF THE INVENTION

The present invention relates to printer systems, more specifically, to a method to reduce the size of font cache memory by reducing the number of characters that must be cached prior to printing a page.

BACKGROUND OF THE INVENTION

When printing with a laser printer, once the printer starts to move the paper, it cannot stop. Therefore, the image rendering computer in the laser printer must provide the raster information as fast as the laser needs the information to keep-up with the paper. This may pose a problem when a printer must print a complex page such as one containing Asian characters. With present technology of laser printers, all of the unique characters to be printed for a given page are rendered and placed into a "font cache." Also, before a page is committed to the laser, all of the characters used in the following page are cached. As the page is exposed, the characters are pulled out of the cache and then placed in the proper place in memory. This requires sufficient memory for a font cache to store each unique character.

The maximum number of characters on an A3 page can approach 5000. Not all these characters are unique. With many languages, the number of unique characters may actually be relatively small, somewhere on the order of 50 to 100. However with some languages such as Japanese Kanji, which includes Katakana and Hirafiana, it is estimated that a font cache of 1800–2000 characters is required to obtain a "reasonable" font cache hit rate. Also, Chinese characters, and other Asian characters could include over 2000 unique characters. Other languages such as Arabic may also have a high number of unique characters.

The amount of space consumed by a 12 point, 600 dpi character is approximately 1600 bytes. Therefore, a font cache of 3.2 megabyte (2000 characters) is required to support printing an A3 page in the Asian market.

An alternative approach to this problem is to render the characters as the page is being exposed. This is commonly called "racing the laser." This typically requires a new method to render the characters as present formatters render between 6 and 40 Asian characters per second. These numbers are expected to only double with the next generation formatters. To obtain significant improvements usually implies a hardware solution for rendering characters. However, even hardware solutions may not have the bandwidth to process the worst case page. The problem comes in trying to process a "strip" of a page that has too many characters. Such a strip will be overrun by the laser.

Therefore the primary purpose of the present invention is to provide a method that brings the elements of a partial font cache, and a high speed rendering process together to print complex Asian pages quickly with reduced memory requirements.

SUMMARY OF THE INVENTION

In summary, Asian laser printers require a lot of memory today because the printer must pre-render all of the characters used in the upcoming page. The printer retrieves these pre-rendered characters from the font cache and places them in the image memory as the printer needs them. The primary disadvantage of this process is memory consumption. Another drawback is performance. As stated, this approach requires that all of the characters be rendered before the page starts through the exposure process.

The present invention renders many of the characters while the page is being exposed. Therefore, the page can start the exposure process sooner with significantly lower memory requirements.

In order to accomplish the objective of the present invention, there is provided a method for reducing memory requirements in a laser printer when printing a page of characters. The printer is capable of rendering only a maximum number of characters per unit time.

First, the page is divided into a series of strips. Next, the entire page is scanned strip by strip for any strips that contain an excess number of characters, where the excess number is that number of character that exceeds the maximum number the printer can render. Assuming a complex strip is found, any common characters in the complex strips are pre-rendered. If, after pre-rendering the common characters any strip is still complex, then the excess characters are pre-rendered and stored in memory. Finally each character in a strip is rendered when the printer is ready to print that strip, if any character in the strip was pre-rendered then it is retrieved from memory.

DETAILED DESCRIPTION OF THE INVENTION

As disclosed above, this invention brings two elements together; the font cache and a fast character rendering process to process complex Asian pages. By combining the right mix of these two elements, pages can be processed that otherwise would require large amounts of memory or faster than feasible character rendering processes.

Ideally, printers process the page in strips. Typically, the printer will process three strips in advance of committing a page to the laser. This reduces the memory requirements because a full page buffer is not required if the formatter can continuously rasterize another strip as a previously rasterized strip is consumed by the printer. As previously stated, with present formatters the characters for each strip are pre-rasterized and stored in a font cache. Therefore, the formatter is required only to pull the character data from the font cache during the strip building process. The present invention is a method whereby the formatter pre-renders only a subset of the characters (only from strips with a large number of characters) and rasterize the majority of the characters in real time. Therefore, as many characters as possible are rasterized in real time and only as many characters as necessary are pulled from a font cache of previously rasterized characters.

Figure 1:
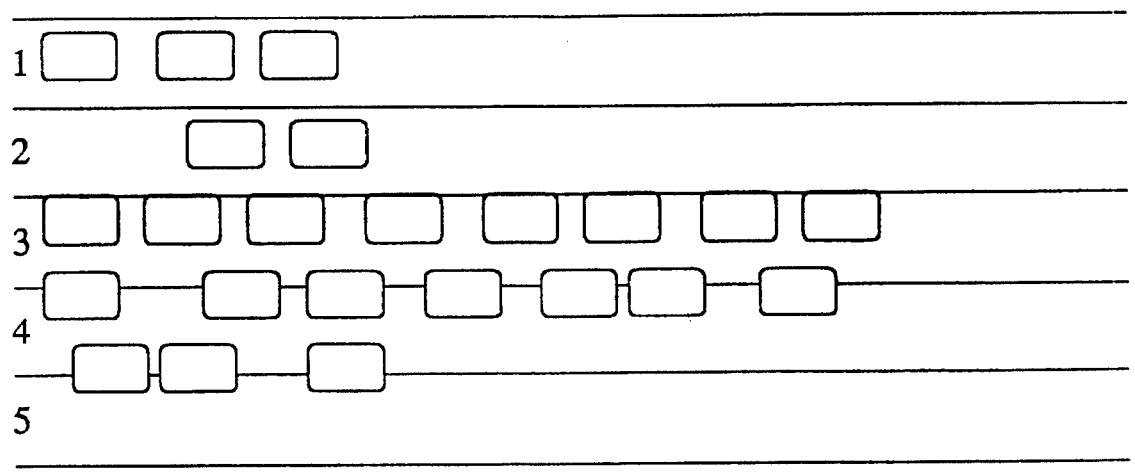
FIG. 1 shows a portion of a page divided into several strips and the characters included within those strips.

FIG. 1 is intended to show the concept of image strips and the maximum processing power needed to process a page. Each square represents an Asian character. The horizontal lines represent a strip to be imaged as it comes up to the laser. The time allowed to image the strip is a function of the speed of the paper running through the printer. For example, a page may have 30 strips and the printer prints eight pages per minute. Thus, a maximum of 250 ms is available to process a strip before the laser catches up with the processing. If more than 250 ms is required, then the laser will overrun the image resulting in termination of printing and ejection of the present page, also known as a page punt.

Still referring to FIG. 1, strip one will need to render three characters within the allowed time. Strip two requires only two characters be rendered in the allotted time. However, strip three will require much more processing than the first two. This strip actually requires that 15 characters be rendered within the allowed time. Notice that some characters lay on a boundary. In a system where the characters are rendered on the fly for each strip, the characters on the line will be rendered twice. Strip four will require 10 characters and strip five will require three characters be rendered.

By way of an example, assume a formatter can rasterize 10 characters in the time required to build one strip. This is a function of the printer's rated speed, processing power of the formatter and complexity and type of font scaling technology. Without this invention, the printer may "punt" on strip #3 if attempting to rasterize all characters in real time. This is slightly more complicated than this simple example may imply because printers typically process 3 strips in advance, but the concept is the same.

With the present invention, the formatter pre-renders and caches the last five characters in strip #3. Therefore, the page can start with only five characters being pre-rendered, thus providing a faster solution. Also, only enough memory to cache the five characters is required. This allows complex Asian pages to be printed without a large font cache. Note that choice of which characters in the font to cache can be dependent on other strips on the page. If one character appears in many strips that require pre-rendering, then this character could be cached thus saving even more memory space. Also note that the number of characters per strip and the maximum number of characters that can be processed in a strip are created for example purposes only.

The formatter must determine the maximum number of characters that can be rendering per strip. The formatter calculates the time per strip, by knowing the size of the strip and the process speed of the printer, (i.e., 4, 8, 16 ppm). These are known quantities. However, the rendering performance of the formatter for an arbitrarily selected font is unknown. The rendering performance can vary widely, as a function of the typeface selected, and performance of the formatter. The gains from this invention would be severely limited if the formatter assumed some worse case rasterization speed independent of the font selected.

This invention proposes that the formatter determine a minimum rasterization speed for each typeface installed, as part of in initialization sequence. The complexity, and therefore rasterization time, of an arbitrary character varies within a typeface. Therefore, some small subset of the more complex characters could be pre-rasterized, and the rasterization speed measured by the formatter. The minimum rasterization performance, for each typeface can then obtained. The formatter would accept a larger number of characters per strip for those fonts that are more "efficient" or render more quickly.

Figure 2A:
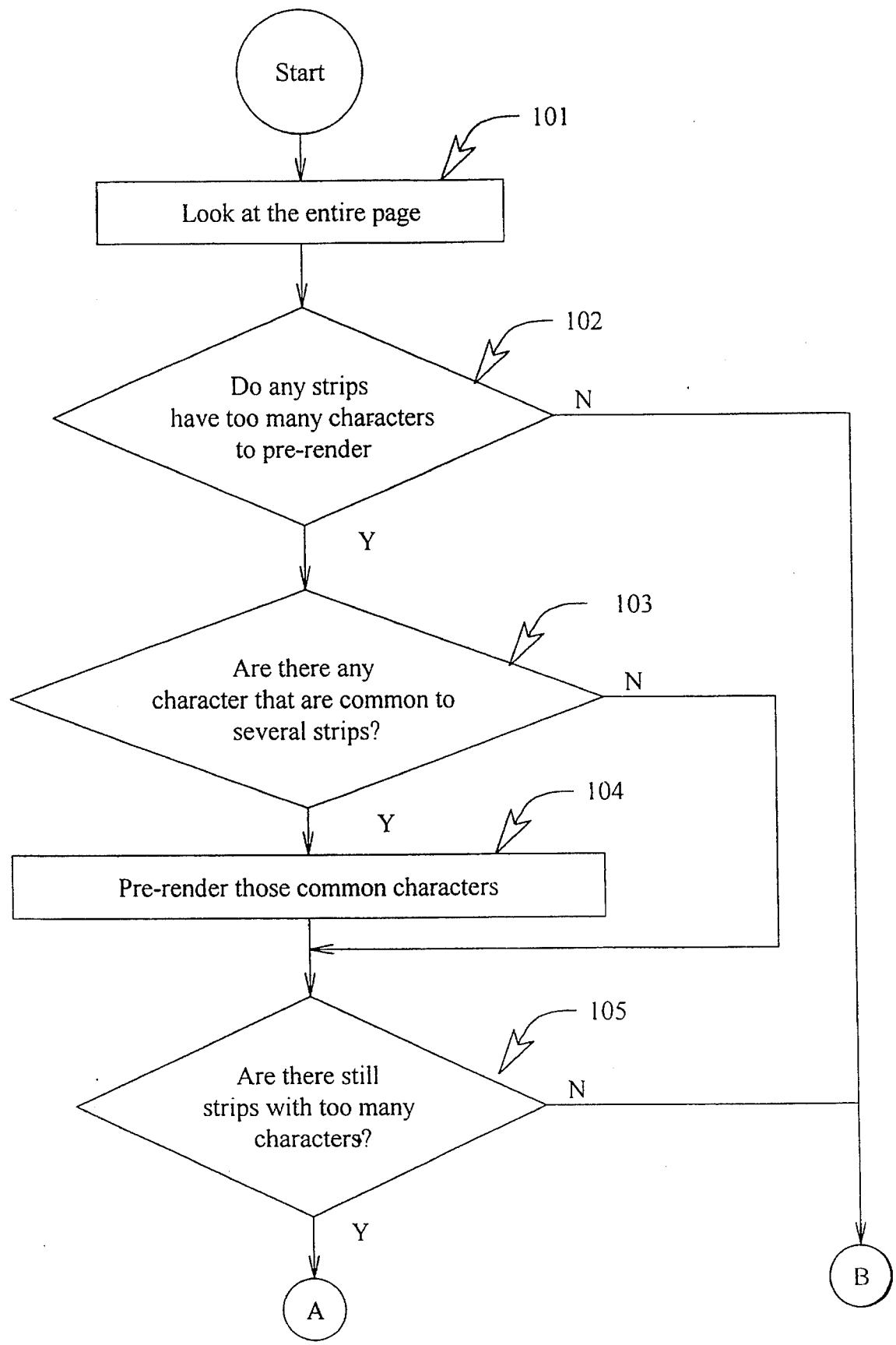
FIG. 2 is a logical flow diagram of the present invention.
Figure 2B:
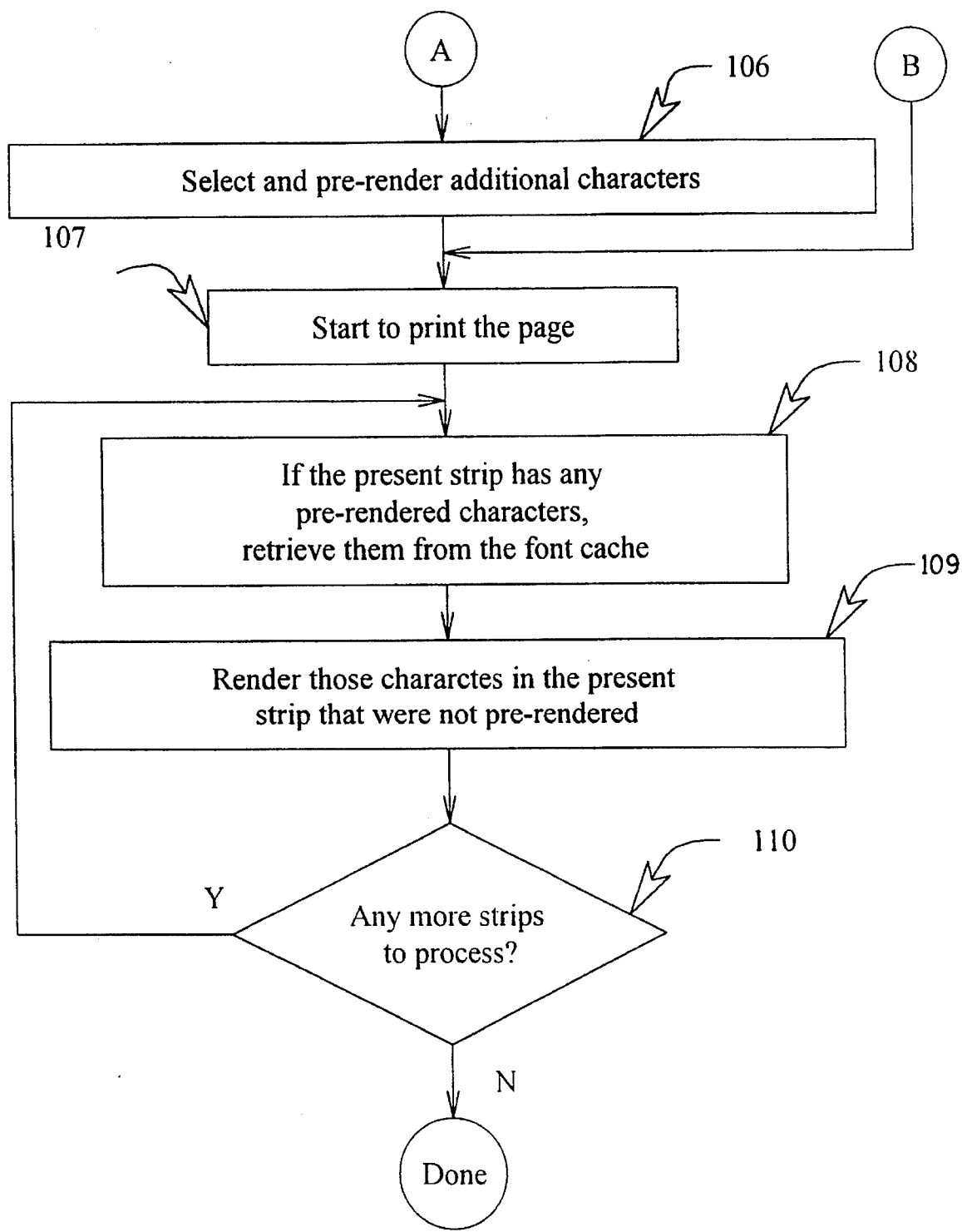

FIG. 2 shows the logical flow for the present invention. First, in box 101, the entire page is scanned to determine the number of unique characters and if any strips contain more characters than the printer system can render in real time. If there are no excessively complex strips, then box 102 branches past all the pre-rendered processes and the printer starts to print the page 107. However, when a page has a complex strip requiring pre-rendering then first the process looks for common characters that can be pre-rendered 103. Any common characters found are pre-rendered 104. A check is again made to determine if the pre-rendering of the common characters was sufficient to reduce the complexity of the strip enough to allow printing of the page 105. When necessary, additional characters are pre-rendered and stored in the font cache 106.

At box 107, the print engine is started. As stated above, it is common to have a plurality of buffers to store a series of strips in anticipation of printing those strips. In the present embodiment the inventors have chosen to use three buffers. However, the present invention is not limited to using any particular number of buffers and will function properly with two or more buffers. If any characters in the present strip being rendered were pre-rendered, they must be retrieved from the font cache 108. Next, the remaining characters in the strip are rendered and placed in the buffer 109. Finally, repeat for all strips on the page 110. Note, another possible reduction in the font cache memory requirements would be to pre-render those characters that are from a typeface that is the slowest to render.

The present invention allows a printing system to use a fast rendering process to render characters on the fly as the page is being exposed. At the same time, the maximum page throughput will not be limited to the peak performance of the rendering process. A small amount of font cache memory will supplement the rendering process in these high character density spots on the page. The invention also frees the printer of the requirement of caching all characters to be used on the following page. This provides a cost savings with less memory, a performance boost by committing the page sooner, and a space savings by using fewer components to implement the system.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method for reducing memory requirements in a printer means when printing a page of characters, said printer means capable of rendering a maximum number of characters per unit time, said method being performed by said printer means, said method comprising the steps of:

dividing said page into a plurality of strips;

scanning said plurality of strips for any strips that contain a number of characters that exceeds said maximum number;

for each strip that contains said number of characters that exceeds said maximum number, pre-rendering those characters that exceed said maximum number and storing said pre-rendered characters in a memory; and rendering each character in a strip from said plurality of strips when said printer means is ready to print said strip, if any character in said strip was pre-rendered then retrieving said pre-rendered character from said memory.

2. A method as claimed in claim 1 wherein said printer means further comprising of at least one buffer means, said step of rendering further comprising the step of:

placing rendered information for said each character of said strip in said at least one buffer means; and instructing said printer means to obtain said rendered information from said at least one buffer means.

3. A method for reducing memory requirements in a printer means when printing a page of characters, said printer means capable of rendering a maximum number of characters per unit time, said method being performed by said printer means, said method comprising the steps of:

dividing said page into a plurality of strips;

scanning said plurality of strips for any complex strips, said complex strips being any strip that contains an excess number of characters where said excess number is that number of character that exceeds said maximum number;

first pre-rendering any common characters in all said complex strips;

for each strip that continue to be a complex strip after subtracting said pre-rendered common characters from said strip, second pre-rendering said excess characters and storing pre-rendered characters in a memory; and rendering each character in a strip from said plurality of strips when said printer means is ready to print said strip, if any character in said strip was pre-rendered then retrieving said pre-rendered character from said memory.

4. A method as claimed in claim 3 wherein said printer means further comprising of at least one buffer means, said step of rendering further comprising the step of:

placing rendered information for said each character of said strip in said at least one buffer means; and instructing said printer means to obtain said rendered information from said at least one buffer means.

* * * * *